United States Patent

[11] 3,583,298

[72] Inventor Earl C. Van Swearingen
 297 Rye Beach Ave., Rye, N.Y. 10580
[21] Appl. No. 614,404
[22] Filed Feb. 7, 1967
[45] Patented June 8, 1971

[54] COLOR PICTURE REPRODUCTION
 16 Claims, No Drawings
[52] U.S. Cl....................................................... 95/1
[51] Int. Cl........................................................ G09f 19/12
[50] Field of Search............................................ 95/1;
 40/134, 135; 161/410, 412

[56] References Cited
 UNITED STATES PATENTS
| | | | |
|---|---|---|---|
| 1,508,916 | 9/1924 | Brewster | 95/12.2X |
| 2,654,971 | 10/1953 | Harrison | 40/134X |
| 2,716,298 | 8/1955 | Spielman | 40/134X |
| 2,919,366 | 12/1959 | Mash | 40/134X |

Primary Examiner—John M. Horan
Attorney—Robert Kemp

ABSTRACT: This invention makes use of highly daylight stimulated luminescent or fluorescent colored surfaces, in an individual colored picture or in multiple colored picture reproduction where a large number of substantially identical vividly colored pictures are required. Here, in this invention a daylight stimulated colored fluorescent surface or surfaces is laid on a light reflecting background surface and then covered in part with a colored nonfluorescent surface or surfaces, to achieve outstanding pictorial contrasts, intensified high lighting, and much more brilliant backlighting effects. This is accomplished in essence by the daylight fluorescent color or colors becoming an actual source of light and local color in direct contrast to non fluorescent color or colors. The result is a more natural looking backlighted picture, that is particularly vivid even in duller daylight.

COLOR PICTURE REPRODUCTION

My invention relates to a method of reproducing an individual picture or multiples of the same picture.

It achieves outstanding pictorial contrasts, intensified highlights, and more brilliant back lighting effects, by placing a multiplicity of surfaces against each other in direct accordance with my proposed process procedure.

I preferably employ a light reflecting background surface, that reflects light by reason of its light color. It may be luminescent or non luminescent white or light color. It may also, as an alternative, be a shiny metallic surface, either a sheet of shiny metal or a sheet having a shiny metallic coating.

My colored luminescent surface may be either a single luminescent surface, or a multiplicity of luminescent surfaces, which, when taken together and placed next to my reflective background surface presents a colored medium for catching light from two directions, namely direct light coming to it from in front or, reflected light coming to it from my light reflecting background surface.

My third surface is a colored surface positioned next to said just previously mentioned said luminescent surface, (or multiple surface combination). This is my nonluminescent surface of considerably reduced light reflecting power. This third surface may also be singular or plural in its color content.

In carrying out my process of picture reproduction, I first establish background surface as above described. I then place next to said background surface my above-described luminescent surface, and against this, I then place my nonluminescent surface (or surfaces).

As an additional step in my process, I may surround my so-produced picture with a considerably darker light absorbing surface, such as a dark red, a dark green, a dark blue, a dark purple or a dark black. This tends to further concentrate the light the picture is directly receiving, and the picture, being within said darker framework, captures to the utmost the various above-mentioned artistic effects desired.

If the picture is to be outdoors and subject to the weather and its elements, I may, still further, and in full accordance with my process, cover my picture and its surrounding framework with a clear substance to decrease its perishability. This further surface may be glass, or a glass clear transparent plastic, in the form of a sheet adhering to the other layers by a suitably glued inner surface.

The luminescent surfaces as enumerated above, are produced by a substance known in the picture producing trade as Day-Glo. Here the sensation of color is produced essentially by any segment of white light which composes the visible spectrum. Color pigments of normal brightness selectively reflect some segments of white light while absorbing and dissipating the rest as heat. Daylight fluorescent pigments similarly reflect segments of visible light and absorb the rest. However, much of the absorbed portion of light is not dissipated as heat by the daylight fluorescent pigments, but instead, is transformed into emitted light of the same hue as that being reflected. Reflected color is thus reinforced with emitted color, producing hues that appear extraordinarily bright to the eye of the observer. Other substances, especially a number of organic dyes, beside fluorescing under the effect of ultraviolet light also have the property of fluorescing when activated by visible light of the blue end of the spectrum - that is, wavelengths in the violet, blue and blue green which compose a large portion of daylight. This particular type of fluorescence is called daylight fluorescence.

Whether an organic compound or dye is fluorescent or not depends upon certain atoms or groups of atoms being present in its molecular structure in a certain way. All fluorescent organic compounds contain an extended series of conjugated double bonds, most of which are present in the form of benzene or hetrocyclic rings. They also contain a group of atoms which are electron acceptors and another group ortho, or para to the first, which can act as electron donors.

Under the stimulus of energy in the form of light, electrons are shifted from the donor group to the benzene ring which, in turn, gives up electrons to the acceptor group. This state of affairs is stable only while each molecule is under the effect of, or is absorbing a photon of light energy. Temporarily, the entire molecule is in a higher energy state. If the molecule is not immediately struck by more light, the electrons drop back to their original unactivated state, and in doing so, most of the absorbed energy is given off as light of a longer wavelength. The normal time required for the electrons to return to their unactivated or lower energy state is very short, $10^{-8}$ seconds or less.

The fluorescence of organic dyes is associated with the individual molecules of the dyes and in order for them to fluoresce efficiently, they must be molecularly dissolved in fairly low concentrations. Since the dyes are organic in nature it is necessary to have an organic medium or carrier to put them into solution, and in order to have a pigment, it is necessary that this medium be a solid. The type of material which meets these requirements for a carrier or matrix for the dyes is an organic resin, and the daylight fluorescent pigments actually are transparent organic resin particles containing dyes in solid solution which are capable of fluorescing.

Day-Glo pigment materials have been successfully used in making the following high-brightness color compositions such as; paper coatings, rotogravure and screen process inks, vinyl plastisols and organosols, textile coatings, and printing inks, paints, lacquers, plastic molding compounds, and many others.

My present process of colored picture reproduction comprehends the utilization of any or all of these above Day-Glo pigment materials, and the employment at the same time of lithography, offset or letter press printing, or in the making of labels or decalcomanias, the employment of mimeographing, silk screening or the painting or coloring of wall or other surfaces by means of a brush, roller, or the pneumatic or hydraulic spraying of these same surfaces in the customary manner.

After the production of a single picture as herein before set forth, it is well within the scope of my process, then to color photograph said picture, and then transfer the results of said color photography to other flat surfaces, by any of the means and/or methods, as above referred to. This, may here be likewise regarded as a further step in my picture reproduction process and in full accordance with my process invention as herein described.

Be it here noted that either my nonluminescent surface, or the darker light absorbing surface used as a dark framework around my picture, may be either the dark colors enumerated, or any useful combination of said same dark colors that it may be artistically advisable to use.

Also let it be known that metallic foil covered, or all metallic, cans, boxes, bottles, or other recepticles, come well within my concept to use, as my background light reflective surfaces.

I claim:

1. A colored picture reproducing process for making a single picture or a multiplicity of substantially identical vividly colored pictures, comprising the steps of placing a colored daylight stimulated luminescent surface or surfaces next to a background light-reflecting surface, and placing next to the said colored luminescent surface, or surfaces a colored nonluminescent surface or surfaces in a manner to achieve outstanding pictorial contrasts, intensified highlights, and more brilliant back-lighting effects, in an individual picture or in multiples of the same picture.

2. The process claimed in claim 1, including placing a much darker light-absorbing surface framing and surrounding said surfaces.

3. The process as claimed in claim 1, including placing a clear transparent surface covering said surfaces.

4. The process as claimed in claim 2 including placing a clear transparent surface covering of said surfaces.

5. The process as claimed in claim 1, wherein said background light-reflecting surface is a white surface.

6. The process as claimed in claim 1, wherein the background light-reflecting surface is a luminescent white surface.

7. The process as outlined in claim 1, wherein the background light-reflecting surface is a shiny metallic surface.

8. The process as claimed in claim 1, wherein said luminescent surface is a plurality of luminescent surfaces.

9. The process as claimed in claim 1, wherein said nonluminescent surface is a plurality of nonluminescent surfaces.

10. The process as claimed in claim 2, including a luminescent surface comprising a plurality of luminescent surfaces, and a nonluminescent surface comprising a plurality of nonluminescent surfaces.

11. The process as claimed in claim 1, wherein said background light-reflecting surface is of light color.

12. The process as claimed in claim 11, including the placement of a transparent surface over all of said surfaces.

13. The process as claimed in claim 1, wherein said luminescent surface is a painted surface.

14. The process as claimed in claim 1, wherein said daylight activated luminescent surface is a silk screened surface.

15. The process as claimed in claim 1, wherein said daylight activated luminescent surface is placed directly on said background light-reflecting surface, and said nonluminescent surface is placed directly on said luminescent surface.

16. An ultrabrilliant colored picture or substantially identical multiples of the same, comprising a background lighting surface, a daylight stimulated luminescent fluorescent colored surface next to said background light-reflecting surface, and a nonfluorescent colored surface partially covering said daylight stimulated luminescent fluorescent surface, in a manner to achieve outstanding pictorial contrasts, intensified highlights, and much more brilliant backlighting effects.